(12) United States Patent
Bae

(10) Patent No.: US 10,039,026 B2
(45) Date of Patent: Jul. 31, 2018

(54) METHOD AND APPARATUS FOR CONTROLLING INTER-BEAM INTERFERENCE

(71) Applicant: ELECTRONICS AND TELECOMMUNICATIONS RESEARCH INSTITUTE, Daejeon (KR)

(72) Inventor: JungSook Bae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 54 days.

(21) Appl. No.: 15/173,622

(22) Filed: Jun. 4, 2016

(65) Prior Publication Data

US 2016/0360536 A1 Dec. 8, 2016

(30) Foreign Application Priority Data

Jun. 4, 2015 (KR) ........................ 10-2015-0079462

(51) Int. Cl.
*H04W 4/00* (2018.01)
*H04W 28/02* (2009.01)
*H04W 16/28* (2009.01)
*H04W 16/10* (2009.01)
*H04W 52/02* (2009.01)
*H04W 72/04* (2009.01)

(52) U.S. Cl.
CPC ........... *H04W 28/02* (2013.01); *H04W 16/28* (2013.01); *H04W 16/10* (2013.01); *H04W 28/0247* (2013.01); *H04W 52/0206* (2013.01); *H04W 72/046* (2013.01)

(58) Field of Classification Search
None
See application file for complete search history.

(56) References Cited

U.S. PATENT DOCUMENTS

| 2002/0168974 | A1* | 11/2002 | Rosen | ................ H04B 7/18513 455/427 |
| 2009/0275339 | A1* | 11/2009 | Weaver | ................ H04W 16/12 455/447 |
| 2010/0165914 | A1 | 7/2010 | Cho et al. | |
| 2014/0073337 | A1 | 3/2014 | Hong et al. | |
| 2015/0063201 | A1 | 3/2015 | Kim et al. | |
| 2016/0192290 | A1* | 6/2016 | Joung | ............... H04W 52/0206 370/328 |

FOREIGN PATENT DOCUMENTS

| EP | 2688330 B1 | 6/2014 |
| KR | 10-2009-0032545 A | 4/2009 |

* cited by examiner

*Primary Examiner* — Jutai Kao
(74) *Attorney, Agent, or Firm* — Rabin & Berdo, P.C.

(57) ABSTRACT

A base station that runs a plurality of beams calculates the sum of proportional fairness metrics for each of terminals scheduled for resource allocation in the beams, creates a beam muting list based on the sum of proportional fairness metrics for each beam, and mutes the beams in the beam muting list for blocking power.

11 Claims, 4 Drawing Sheets

METHOD AND APPARATUS FOR CONTROLLING INTER-BEAM INTERFERENCE

CROSS-REFERENCE TO RELATED APPLICATION

This application claims priority to and the benefit of Korean Patent Application No. 10-2015-0079462 filed in the Korean Intellectual Property Office on Jun. 4, 2015, the entire contents of which are incorporated herein by reference.

BACKGROUND OF THE INVENTION (a) Field of the Invention

The present invention relates to a method and apparatus for controlling inter-beam interference, and more particularly, to a method and apparatus for controlling inter-beam interference to mitigate interference between adjacent beams in a stationary multi-beam-based mobile communication system.

(b) Description of the Related Art

Driven by the growth of the IoT (Internet of Things), the rapid spread of smart devices, and the advent of immersive UHD (Ultra High Definition) service, mobile traffic is increasing at a rapid pace and is expected to be more than 1000 times the current rate by 2020. In order to transfer and process this increasing mobile communication traffic, there is a need for 5G mobile communication systems to use new frequency bands that provide wider bandwidth. In the light of this, the industry is looking at the use of 30 to 300 GHz millimeter wave bands.

The millimeter wave bands have a wider range of coverage and make continuous allocation of radio resources easier, compared to bands below 3 GHz used in traditional mobile communication networks, which can lead to an increase in the capacity of communication systems. However, millimeter waves propagate in straight lines and cause high propagation loss. To overcome these problems, beamforming techniques on massive antenna arrays are used in millimeter wave-based mobile communication systems.

Beamforming techniques can be divided into fixed beamforming and adaptive beamforming. Fixed beamforming is preferred because of its comparatively low hardware complexity and low operating overhead. Each beam generated by fixed beamforming constitutes a small beam region in which frequency resources are re-used, thus greatly enhancing transmission efficiency of terminals through space-division multiple access.

With space-division multiple access techniques based on conventional fixed beamforming, however, beams overlap to prevent coverage holes, and all beams are constantly emitted. Due to this, terminals in beam overlapping areas are highly affected by inter-beam interference, and have poor signal-to-interference-plus-noise ratio (SINR) performance. Thus, it is difficult to expect an increase in service capacity.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for controlling inter-beam interference to reduce interference between adjacent beams.

An exemplary embodiment of the present invention provides a method for controlling inter-beam interference by a base station that runs a plurality of beams. The inter-beam interference controlling method may include: calculating the sum of proportional fairness metrics for each of terminals scheduled for resource allocation in a plurality of beams; creating a beam muting list including beams that power is blocked, based on the sum of proportional fairness metrics for each beam; and muting the beams in the beam muting list for blocking power.

The creating may include: predicting the base station capacity after muting beams for which the sum of proportional fair metrics is 0 and setting the predicted base station capacity as the current base station capacity; predicting the base station capacity after muting beams other than those for which the sum of proportional fairness metrics is 0, in order of lowest to highest sum of proportional fairness metrics, and setting the predicted base station capacity as the expected base station capacity for each beam; and comparing the difference between the expected base station capacity for each beam and the current base station capacity with a set threshold and selecting beams to add to the beam muting list.

The creating may further include, if the difference between the expected base station capacity for each beam and the current base station capacity is greater than the set threshold, adding the corresponding beam to the beam muting list.

The creating may further include adding the beams for which the sum of proportional fairness metrics is 0 to the beam muting list.

The creating may further include predicting the base station capacity by adding the sum of data rates for non-muted beams and a predicted increase in data rate due to muted beams.

The plurality of beams each may have a fixed beam region in which the same frequency is used.

Another exemplary embodiment of the present invention provides an apparatus for controlling inter-beam interference by a base station that runs a plurality of beams. The inter-beam interference controlling apparatus may include a plurality of schedulers, a control scheduler, and a transceiver. The plurality of beam schedulers may calculate the sum of proportional fairness metrics for each of terminals scheduled for resource allocation in a plurality of beams. The control scheduler may create a beam muting list including beams that power is blocked, based on the sum of proportional fairness metrics for each beam. The transceiver may mute the beams in the beam muting list for blocking power.

The control scheduler may predict the base station capacity after muting beams for which the sum of proportional fair metrics is 0 and set the predicted base station capacity as the current base station capacity, predict the base station capacity after muting beams other than those for which the sum of proportional fairness metrics is 0, in order of lowest to highest sum of proportional fairness metrics, and set the predicted base station capacity as the expected base station capacity for each beam, and compare the difference between the expected base station capacity for each beam and the current base station capacity with a set threshold and select beams to add to the beam muting list.

The control scheduler may add the beams for which the sum of proportional fairness metrics is 0 to the beam muting list.

The control scheduler may predict the base station capacity by adding the sum of data rates for non-muted beams and a predicted increase in data rate due to muted beams.

The plurality of beams each may have a fixed beam region in which the same frequency is used.

According to an embodiment of the present invention, beams affecting inter-beam interference are selected based on proportional fairness metrics, and the power of these beams are blocked in order to mitigate inter-beam interference caused by constant beam emission in a stationary multi-beam-based mobile communication system. Hence, the effect of interference can be mitigated. This increases the signal-to-interference-plus-noise ratio of terminals in service, thus inducing an increase in overall system capacity.

DETAILED DESCRIPTION OF THE EMBODIMENTS

Figure 1:
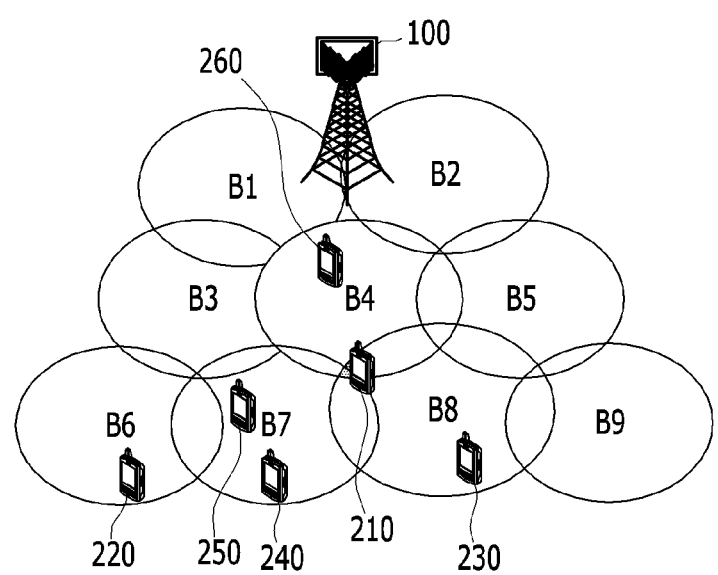
FIG. 1 is a view showing a fixed beamforming-based space-division multiple access communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

In the specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include all or some of the functions of the MT, MS, AMS, HR-MS, SS, PSS, AT, UE, etc.

In the specification, a base station (BS) may indicate an advanced base station (ABS), a high reliability base station (HR-BS), a node B (NodeB), an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, and a small base station [such as a femto base station (femto BS), a home node B (HNB), a home eNodeB (HeNB), a pico base station (pico BS), a metro base station (metro BS), or a micro base station (micro BS)], and it may include entire or partial functions of the ABS, HR-BS, nodeB, eNodeB, AP, RAS, BTS, MMR-BS, RS, RN, ARS, HR-RS, and small base station.

Now, a method for controlling inter-beam interference according to an exemplary embodiment of the present invention will be described.

FIG. 1 is a view showing a fixed beamforming-based space-division multiple access communication system according to an exemplary embodiment of the present invention.

Referring to FIG. 1, a fixed beamforming-based space-division multiple access (SDMA) communication system includes a base station 100 and at least one of terminals 210, 220, 230, 240, 250, and 260.

The base station 100 uses millimeter wave frequency bands above 10 GHz for communication with the terminals 210, 220, 230, 240, 250, and 260, and runs multiple beams B1 to B9 within a cell. Each beam B1 to B9 has service coverage of several tens of meters and uses the 1 GHz bandwidth. The direction and size of each beam B1 to B9 are fixed, and each beam B1 to B9 forms a fixed beam region in which frequency resources are re-used. That is, each beam B1 to B9 forms a fixed beam region in which the same frequency resources are used.

Also, each beam B1 to B9 overlaps adjacent beam regions in order to prevent coverage holes. Terminals on beam boundaries due to beam overlapping areas are affected by interference between adjacent beams and thus have very low signal-to-interference-plus-noise ratio (SINR) performance.

The base station 100 selects a beam with no terminal serving to mitigate the effect of interference between adjacent beams and improve overall system performance or a beam with a lower service ratio than other beams, and mutes the selected beam. Here, "mute" represents blocking power. Hereinafter, the means of power blocking can be used as means of muting.

The base station 100 may select a beam to mute based on proportional fairness metrics for each beam.

As shown in FIG. 1, a terminal 210 belongs to the beam region of the beam B8, but gets severe interference from the adjacent beams B4 and B7.

The base station 100 may select the beam B4 to mute, based on the proportional fairness metrics for each beam, and mute the beam B4. By muting the adjacent beam B4, the effect of interference is mitigated, and the SINR of the terminal 210 is increased, thus improving the overall system capacity.

Figure 2:
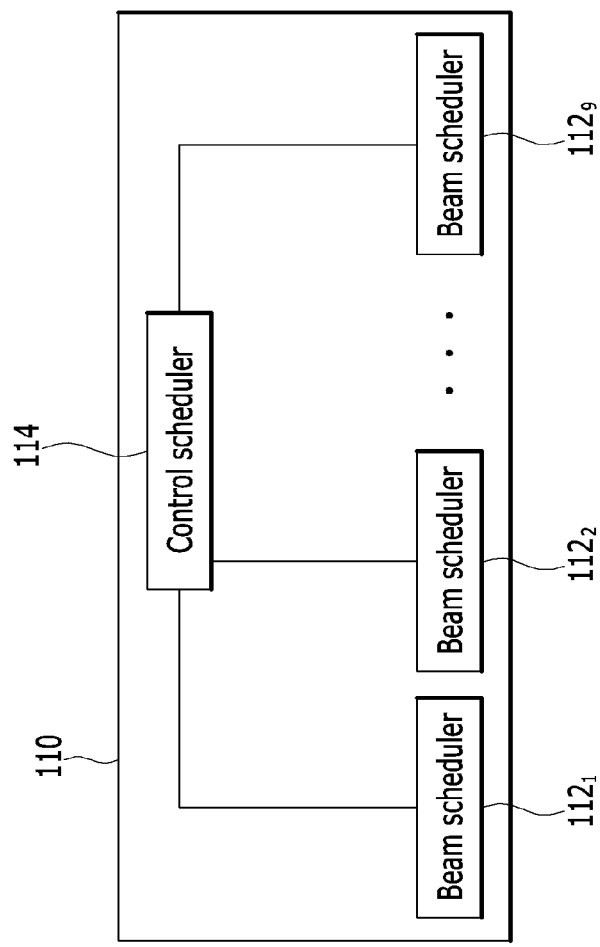
FIG. 2 is a view showing a scheduler structure of a base station according to an exemplary embodiment of the present invention.

FIG. 2 is a view showing a scheduler structure of a base station according to an exemplary embodiment of the present invention.

Referring to FIG. 2, the base station 100's schedulers 110 include a plurality of beam schedulers $112_1$ to $112_9$ and a control scheduler 114.

The beam schedulers $112_1$ to $112_9$ calculate proportional fairness metrics for each terminal for user and control plane packets, based on QoS requirements associated with radio bearers for the terminals in the beams B1 to B9, channel quality at each terminal, buffer status, interference situation, restrictions on or preference for particular resources, etc., and allocate resources based on the proportional fair metrics for each terminal.

In an inter-beam resource allocation method based on proportional fairness metrics for each terminal, a terminal k*, which has the highest ratio of required data rate $R_k[n]$ to average data rate $T_k[n]$ in a particular time slot m, is selected as in Equation 1.

$$k^* = \arg\max_{k=1,2,\cdots,K} \frac{R_k[n]}{T_k[n]} \quad \text{(Equation 1)}$$

where K denotes the total number of terminals to be scheduled in a time slot n.

The average data rate $T_k[n]$ may be represented as in Equation 2.

$$T_k[n]=(1-1/t_c)T_k[n-1]+(1/t_c)R_k[n-1] \quad \text{(Equation 2)}$$

where $t_c$ is the time constant for trade-off between fairness and efficiency, and in general, $t_c$=1000. The required data rate $R_k[n]$ for non-scheduled terminals in a corresponding frame in this process is set to 0, and the average data rate $T_k[n]$, even for terminals having no data to transmit, updates.

The control scheduler 114 selects a beam to mute based on the proportional fair metrics for each beam in order to mitigate interference and expand system capacity, and delivers beam muting information by interfacing with the physical layer.

Figure 3:
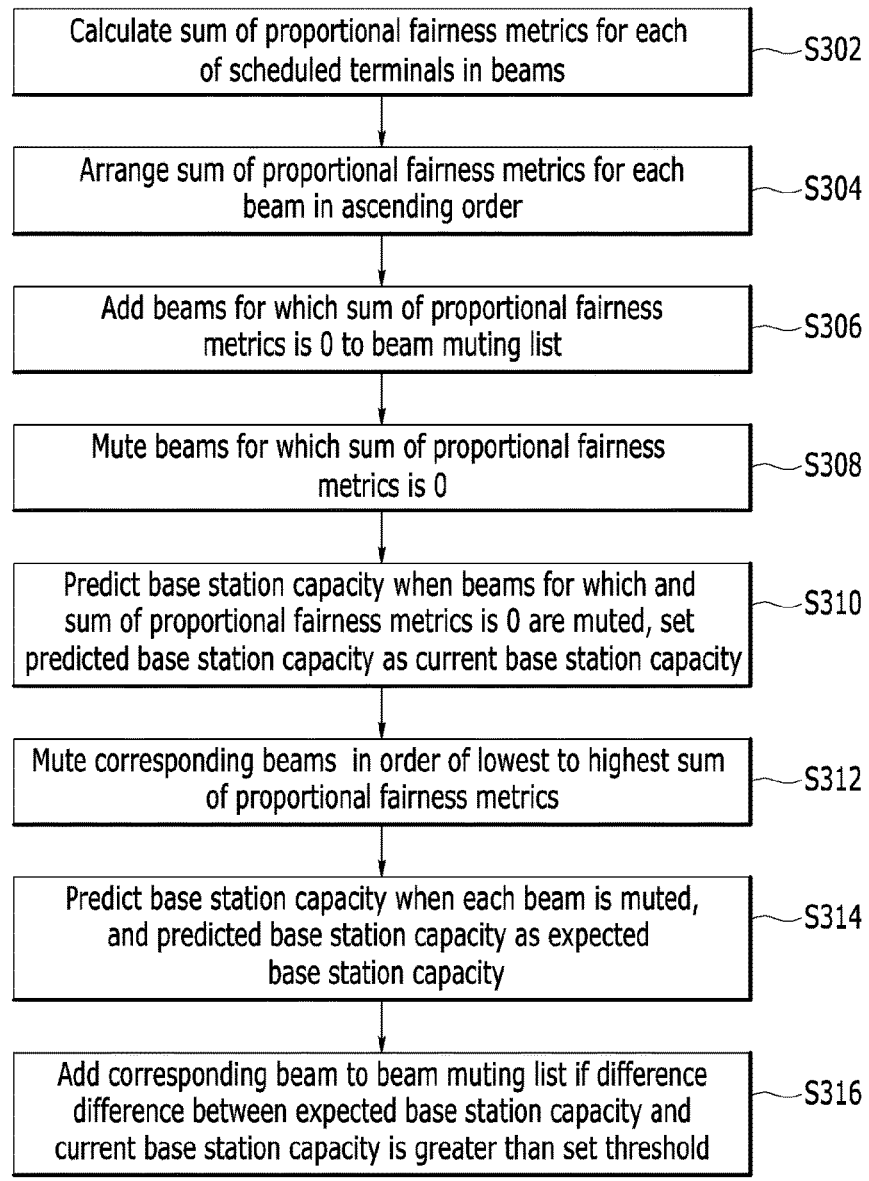
FIG. 3 is a flowchart showing a method of selecting a beam to mute according to an exemplary embodiment of the present invention.

That is, the control scheduler 114 mutes beams that do not help improve system performance, based on the proportional fairness metrics for each beam, thus reducing inter-beam interference. FIG. 3 is a flowchart showing a method of selecting a beam to mute according to an exemplary embodiment of the present invention.

Referring to FIG. 3, the beam schedulers $112_1$ to $112_9$ schedule the terminals in the beams B1 to B9, respectively, for resource allocation, and calculate the sum of proportional fairness metrics for each of the scheduled terminals in the beams (S302), and deliver information about the sum of proportional fairness metrics for each beam to the control scheduler 114.

When scheduling for each beam is completed, the control scheduler 114 arranges the sum of proportional fairness metrics for each beam in ascending order (S304).

If the sum of proportional fairness metrics is 0, it means that the corresponding beam has no terminal it has to service. Thus, the control scheduler 114 adds this beam to a beam muting list (S306). Afterwards, the control scheduler 114 mutes beams for which the sum of proportional fairness metrics is 0 (S308), and predicts the base station capacity when the beams for which the sum of proportional fairness metrics is 0 are muted. In this instance, the predicted base station capacity is set as 'current base station capacity' (S310). The base station capacity may be predicted as in Equation 3.

Base station capacity=Sum of data rates for non-
muted beams+Predicted increase in data rate
due to muted beams (Equation 3)

Next, the control scheduler 114 mutes the beams other than those for which the sum of proportional fairness metrics is 0, in order of lowest to highest sum of proportional fairness metrics (S312), and predicts the base station capacity when each beam is muted. In this instance, the predicted base station capacity is set as 'expected base station capacity' (S314).

The control scheduler 114 checks whether the difference between the expected base station capacity, which is predicted in order of lowest to highest sum of proportional fairness metrics, and the current base station capacity is greater than a set threshold, as in Equation 4.

Expected base station capacity−Current base station
capacity>ε (Equation 4)

If the difference between the expected base station capacity and the current base station capacity is greater than the set threshold, the control scheduler 114 adds the corresponding beam to a beam muting list (S316).

In contrast, if the difference between the expected base station capacity and the current base station capacity is equal to or less than the set threshold, the control scheduler 114 does not add the corresponding beam to the list of a beam muting list.

In this way, the control scheduler 114 creates a beam muting list for each scheduled beam, and delivers the beam muting list and information about the beam mute time to the physical layer. The beam mute time is a time period during which the corresponding scheduling information is valid, which is equal to a time unit of scheduling.

Figure 4:
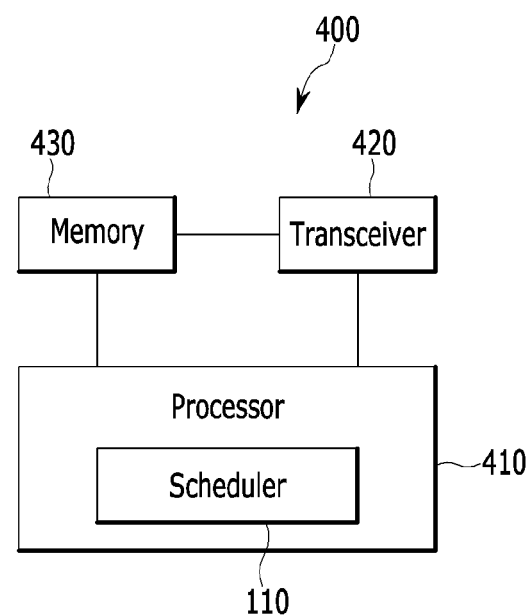
FIG. 4 is a view showing an apparatus for controlling inter-beam interference according to an exemplary embodiment of the present invention.

FIG. 4 is a view showing an apparatus for controlling inter-beam interference according to an exemplary embodiment of the present invention.

Referring to FIG. 4, the inter-beam interference controlling apparatus 400 includes a processor 410, a transceiver 420, and a memory 430. The inter-beam interference controlling apparatus 400 may be implemented within the base station 100.

The processor 410 runs multiple beams, and includes a scheduler 110 explained with reference to FIG. 2 for inter-beam interference control. The processor 410 performs the functions of the schedulers 110 explained with reference to FIG. 2 and FIG. 3. The processor 410 selects beams to mute, based on proportional fairness metrics for each beam, and creates a beam muting list, and delivers the beam muting list and information about the beam mute time to the physical layer.

The transceiver 420 may be implemented in the physical layer and send and receive control signals and data to and from terminals by using multiple beams. The transceiver 420 mutes corresponding beams, based on the beam muting list and information about the beam mute time delivered from the processor 410.

The memory 430 may store instructions for the processor 410 to execute or load instructions from storage (not shown) and temporarily store them, and the processor 410 may execute the instructions stored or loaded in the memory 430.

The processor 410 and the memory 430 are interconnected via a bus (not shown), and an input/output interface (not shown) may be connected to the bus. In this instance, the transceiver 420 may be connected to the input/output interface, and peripherals such as input devices, displays, speakers, storage, etc. may also be connected to it.

According to an embodiment of the present invention, beams affecting inter-beam interference are selected based on proportional fairness metrics, and the power of these beams are blocked in order to mitigate inter-beam interference caused by constant beam emission in a stationary multi-beam-based mobile communication system. Hence, the effect of interference can be mitigated. This increases the signal-to-interference-plus-noise ratio of terminals in service, thus inducing an increase in overall system capacity.

Exemplary embodiments of the present invention are implemented not only through the apparatus and method, but may be implemented through a program that realizes functions corresponding to the configuration of the exemplary embodiments of the present invention or a recording medium in which the program is recorded. The invention can be easily implemented by those skilled in the art as described in the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling inter-beam interference by a base station that runs a plurality of beams, the method comprising:
   calculating a sum of proportional fairness metrics for each of terminals scheduled for resource allocation in the plurality of beams;
   predicting a base station capacity after muting beams for which the sum of proportional fair metrics is 0, and setting the predicted base station capacity as a current base station capacity;
   predicting the base station capacity after muting beams other than those for which the sum of proportional fairness metrics is 0, in order of a lowest to highest sum of proportional fairness metrics, and setting the predicted base station capacity as an expected base station capacity for each beam;
   creating a beam muting list including beams that power is blocked, based on the expected base station capacity for each beam and the current base station capacity; and
   muting the beams in the beam muting list for blocking power.

2. The method of claim 1, wherein the creating comprises:
   comparing a difference between the expected base station capacity for each beam and the current base station capacity with a set threshold; and
   selecting beams to add to the beam muting list based on a result of the comparing.

3. The method of claim 2, wherein the selecting comprising, if the difference between the expected base station capacity for each beam and the current base station capacity is greater than the set threshold, adding said each beam to the beam muting list.

4. The method of claim 2, wherein the creating further comprising adding the beams for which the sum of proportional fairness metrics is 0 to the beam muting list.

5. The method of claim 2, wherein the base station capacity is predicted by adding a sum of data rates for non-muted beams and a predicted increase in data rate due to muted beams.

6. The method of claim 1, wherein the plurality of beams each have a fixed beam region in which a same frequency is used.

7. An apparatus for controlling inter-beam interference by a base station that runs a plurality of beams, the apparatus comprising:
   a plurality of beam schedulers that calculate a sum of proportional fairness metrics for each of terminals scheduled for resource allocation in the plurality of beams;
   a control scheduler that
      predicts a base station capacity after muting beams for which the sum of proportional fair metrics is 0 and sets the predicted base station capacity as a current base station capacity,
      predicts the base station capacity after muting beams other than those for which the sum of proportional fairness metrics is 0 in order of a lowest to highest sum of proportional fairness metrics and sets the predicted base station capacity as an expected base station capacity for each beam, and
      creates a beam muting list including beams that power is blocked, based on the expected base station capacity for each beam and the current base station capacity; and
   a transceiver that mutes the beams in the beam muting list for blocking power.

8. The apparatus of claim 7, wherein the control scheduler compares a difference between the expected base station capacity for each beam and the current base station capacity with a set threshold and selects beams to add to the beam muting list.

9. The apparatus of claim 8, wherein the control scheduler adds the beams for which the sum of proportional fairness metrics is 0 to the beam muting list.

10. The apparatus of claim 8, wherein the control scheduler predicts the base station capacity by adding a sum of data rates for non-muted beams and a predicted increase in data rate due to muted beams.

11. The apparatus of claim 7, wherein the plurality of beams each have a fixed beam region in which a same frequency is used.

* * * * *